(12) United States Patent
Rameshni et al.

(10) Patent No.: US 8,617,509 B1
(45) Date of Patent: Dec. 31, 2013

(54) THERMAL REDUCTION OF SULFUR DIOXIDE TO SULFUR IN A SINGLE REACTION FURNACE

(71) Applicants: Mahin Rameshni, Monrovia, CA (US); Stephen L Santo, La Crescenta, CA (US)

(72) Inventors: Mahin Rameshni, Monrovia, CA (US); Stephen L Santo, La Crescenta, CA (US)

( * ) Notice: Subject to any disclaimer, the term of this patent is extended or adjusted under 35 U.S.C. 154(b) by 0 days.

(21) Appl. No.: 13/854,092

(22) Filed: Mar. 31, 2013

(51) Int. Cl.
*C01B 17/02* (2006.01)

(52) U.S. Cl.
USPC .......................................... 423/570; 423/574.1

(58) Field of Classification Search
USPC ............................................... 423/570, 574.1
See application file for complete search history.

(56) References Cited

U.S. PATENT DOCUMENTS

| | | | | |
|---|---|---|---|---|
| 3,199,955 A | * | 8/1965 | West et al. | 423/570 |
| 3,851,050 A | * | 11/1974 | Groenendaal et al. | 423/574.1 |
| 3,928,547 A | * | 12/1975 | Daley et al. | 423/564 |
| 4,452,772 A | * | 6/1984 | Knoblauch et al. | 423/569 |
| 4,459,275 A | * | 7/1984 | Seike et al. | 423/569 |

* cited by examiner

*Primary Examiner* — Timothy Vanoy

(57) ABSTRACT

Processes for the thermal reduction of sulfur dioxide to elemental sulfur in a single reaction furnace are disclosed. The reaction furnace contains an alumina monolith that performs as an active catalyst. The reaction furnace is followed by a Claus conversion zone, wherein H2S and SO2 react to produce additional elemental sulfur. Three methods to eliminate soot formation and two methods to consume produced H2 and CO are described. One or combination of these methods may be employed which consists of a) adding steam (water vapor), b) adding recycled sulfur or c) adding recycled tail gas.

21 Claims, 3 Drawing Sheets

THERMAL REDUCTION OF SULFUR DIOXIDE TO SULFUR IN A SINGLE REACTION FURNACE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure relates generally to Processes for the thermal reduction of sulfur dioxide to elemental sulfur. Sulfur dioxide is reduced in a single reaction furnace zone. The design of the reaction furnace includes an alumina monolith that performs as an active catalyst to reduce the residence time required in the reaction furnace and to enhance completion of the reduction reactions. The reaction furnace is followed by the Claus conversion zone, wherein residual $H_2S$ and $SO_2$ are further reacted to produce additional elemental sulfur. Three methods to eliminate soot formation and two methods to consume produced H2 and CO are described. Wherein one or a combination of these methods could be employed which consists of a) adding steam (water vapor), b) adding recycled sulfur and c) adding recycled tail gas.

DESCRIPTION OF THE RELATED ART

Sulfur dioxide is found in many industrial gases emanating from plants involved in roasting, smelting and sintering sulfide ores, or gases from power plants burning high sulfur coal or fuel oils or other sulfurous ores or other industrial operations involved in the combustion of sulfur-bearing fuels, such as fuel oil. One of the more difficult environmental problems facing industry is how to economically control $SO_2$ emissions from these sources.

One of the approaches is the recovery of sulfur dioxide from such gases and related waste streams, preferably in the form of elemental sulfur which may be reused to an economic advantage, especially as it may be stored and transported less expensively than other reduction products.

The reduction of sulfur dioxide, including its reduction to elemental sulfur, has been investigated extensively over the years. In fact, a number of processes are known for the reduction of sulfur-dioxide containing gases and gas streams to elemental sulfur. One proposed process, suggested in German patent application No. 2,365,116, describes a process for reducing sulfur dioxide-containing gases with relatively pure hydrogen at temperatures greater than 600° C. without the use of a reduction catalyst. Due to this process requiring relatively pure hydrogen gas, this process is relatively expensive, and may not be appropriate for large-scale reduction processes.

Several processes schemes have been developed to recover elemental sulfur from $SO_2$ streams. There are several fundamental problems common to these efforts. In particular, byproduct formation of $H_2S$, $CS_2$, COS, $H_2$ and CO reduces sulfur recovery and fuel efficiency and requires larger equipment because of the increased gas flow. Soot formation reduces the quality of the sulfur product and fouls the equipment and catalyst beds reducing the reliability of the unit.

Thermal Reduction of $SO_2$ to Sulfur was developed during 1909-11. S. W. Young investigated reduction of $SO_2$ with methane and other hydrocarbons on a laboratory scale, (Fleming, E. P., and Fitt, T. C., High Purity Sulfur from Smelter Gases—Reduction with Natural Gas, Ind. Eng. Chem., 42, 2249-2253, November 1950).

In a 1934 article, Yushkevich, and others, discuss in detail the various possible reaction products from the combination of $SO_2$ and a hydrocarbon reducing agent, including $H_2S$, COS, $CS_2$ and sulfur. Experiments suggested 900-1000° C. as the optimum temperature. (Yushkevich et al, Article ZH. KHIM. PROM., No. 2, 33-37, 1934 and U.S. Pat. No. 3,928,547, Process for the Reduction of Sulfur Dioxide, Daley, W. D., Wilkalis, J. E., and Pieters, W. J. M., Allied Chemical Corp., Dec. 23, 1975).

In 1938, American Smelting and Refining Company (ASARCO) initiated investigations, which soon indicated that relatively low-grade $SO_2$ might be directly converted to reasonably pure sulfur by reduction with natural gas. (Fleming, E. P., and Fitt, T. C., High Purity Sulfur from Smelter Gases—Reduction with Natural Gas, Ind. Eng. Chem., 42, 2249-2253, November 1950). Laboratory and small-scale pilot operations were gradually expanded until a semi-commercial 5-tpd unit was operated during 1940-45. Gas from copper roasters or converters containing 5-8% $SO_2$ and 9-12% oxygen was combusted with sufficient natural gas to consume all the oxygen to $CO_2$, plus additional fuel to react with an appropriate portion of the $SO_2$ according to the following overall reaction with $CH_4$ as shown in the following reaction:

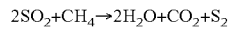
$$2SO_2 + CH_4 \rightarrow 2H_2O + CO_2 + S_2$$

Thermal Reduction of $SO_2$ was further developed in the 1980s. In a 1980 patent, a hydrocarbon fuel, gaseous or liquid, is partially oxidized in a reaction furnace to generate $H_2$ and CO and $SO_2$ added to the second flame zone to react with the $H_2$ and indirectly, CO (by virtue of water gas shift to $CO_2$ and $H_2$). The firing rate is adjusted to yield a mixture of $H_2S$ and $SO_2$ in the molar ratio of 2:1 as required by Claus stoichiometry (U.S. Pat. No. 4,207,304, Beavon, D. K., Process for Sulfur Production, Ralph M. Parsons Company, Jun. 10, 1980). One disadvantage is that introduction of $SO_2$ to the second flame zone increases hydrocarbon fuel consumption. The other differences are the design of reaction furnace using alumina monolith where performs as an active catalyst, to improve the reaction as well as optimize the residence time.

In similar application, (U.S. Pat. No. 7,722,852 B2, May 25, 2010, Rameshni, M.) describes a process for the thermal reduction of sulfur dioxide to sulfur. An expensive cobalt molybdenum hydrogenation catalyst in a fixed bed catalytic reactor is employed to consume excess $H_2$ and CO produced in the reaction furnace. In some cases a recycle is required to moderate the temperature rise in the catalyst bed.

In similar application, (U.S. application Ser. No. 13/164,729, Jun. 20, 2011, Rameshni, M.) describes a process for the thermal reduction of sulfur dioxide to sulfur in two zone reaction furnace and followed by the catalytic stages. The scheme works very well, however, the capital cost is higher due to the addition thermal stage.

Other approaches described in the art have utilized interesting methodologies, but methodologies which nonetheless are often not applicable to large-scale process situations, are cost inefficient, result in the formation of other, non-desirable products, or do not have high recovery and/or product quality values. For example, one reported process for the conversion of elemental sulfur to sulfur dioxide involves the reduction with a carbonaceous material such as cola, wood, or petroleum coke in a reaction zone containing a molten salt, such as sodium or potassium sulfide. Another approach to solving the problem at hand includes the reduction of sulfur dioxide (from an off-gas) to elemental sulfur via a process of converting the sulfur dioxide to sulfur by passing a sulfur dioxide-containing off-gas through a reactor containing a mixture of fresh and recycled coal. Finally, biological processes, such as those reported in U.S. Pat. No. 5,269,929, have been suggested, proposing the microbial reduction of sulfur dioxide to hydrogen sulfide using sulfate reducing bacteria in co-culture with anaerobic heterotrophs, such as the sulfate reducing bacteria belonging to the general Desulfovibrio and the like, under anaerobic conditions. Reportedly, the $SO_2$ converted by the microorganisms to $H_2S$ may then be reacted with some remaining $SO_2$ in a Claus reactor in order to produced elemental sulfur, as desired. However, the applicability of this process to industrial-scale processes has not yet been shown.

This application for patent discloses processes for the thermal reduction of sulfur dioxide to elemental with a single reaction furnace to minimize the formation of byproducts and soot formation.

BRIEF SUMMARY OF THE INVENTION

The present invention relates to a process for recovering sulfur from sulfur dioxide ($SO_2$) containing gases. More particularly to processes for the thermal reduction of sulfur dioxide, such as that from effluent streams, to elemental sulfur with a single reaction furnace. Key advantages are reduced byproduct $H_2$ and CO, reduced fuel consumption, no need for expensive catalysts, and reasonable operating and capital costs.

In accordance with aspects of the present invention, the process comprises 2 reaction zones: a single thermal reaction furnace zone, and a Claus conversion zone. In the reaction furnace zone a reducing agent, for example natural gas is combusted with $SO_2$ and oxygen at an elevated temperature. In order to prevent soot formation in the reaction furnace one or combinations of these method(s) is employed: a) adding steam (water vapor) to the reaction furnace by mixing with the reducing agent such as natural gas, b) adding heated recycle sulfur to the burner, c) recycling a portion of the tail gas from any of the condenser to the single reaction furnace mixing with the reducing agent. In addition, the reaction furnace design consists of an alumina brick refractory and special design of alumina monolith that performs as an active catalyst.

In accordance with further aspects of the present invention, the process comprises at least 2 reaction zones: a single thermal reaction furnace zone, and a Claus conversion zone. In the reaction furnace zone a reducing agent, for example natural gas is combusted with $SO_2$ and oxygen at an elevated temperature. In order to consume the produced H2 and CO in the reaction furnace one or combinations of these method(s) is employed: a) adding heated recycle sulfur to the reaction furnace, b) recycling a portion of the tail gas from the waste heat boiler, or any of the sulfur condenser outlets to the single reaction furnace to consume produced H2 and CO. In addition, the reaction furnace design consists of an alumina brick refractory and an alumina monolith which performs as an active catalyst.

It is known that alumina catalyst can stabilized by a rare earth oxide deposited on a cordierite monolith which performs as an active catalyst in order to improve the reduction reactions in the reaction furnace.

In accordance with further aspects of the present invention, the reaction furnace consists of a special design feature using an alumina monolith which performs as an active catalyst to improve the reaction with one or more checker wall to create a good mixing and to reduce the residence time required to substantially complete the reactions. It is found that the residence time of 0.2 to 10 seconds would be adequate.

In accordance with aspects of the present invention, the process comprises contacting a reducing agent with oxygen and $SO_2$, and by adding steam (water vapor) in a single refractory reaction furnace via mixing with the reducing agent such as natural gas at a temperature ranging from about 1100° C. to 1400° C. for a period of time sufficient to prevent the soot formation and to improve the sulfur quality. The purpose of adding steam is to eliminate the soot formation. The effluent stream from the reaction furnace flows to the waste heat boiler for cooling the reaction furnace effluent gas and to recover sulfur; contacting the cooled effluent gas in a Claus conversion zone comprising a fixed bed catalytic reactor which contains an activated catalyst at a temperature ranging from about 165° C. to 400° C. to convert $H_2S$ and $SO_2$ to sulfur, cooling the effluent gas to recover additional sulfur.

In is now known that a small amount of sulfur would help to reduce the reduction temperature. The amount of sulfur may range from 0.05 to 3 mole percent preferably from 0.1 to 1.5 mole percent of the feed gas. If more than 3% is used, then it will be in a form of vapor and do not have advantages, and will exit from the reaction furnace among other gases and will be condensed and returned to the sulfur pit.

In accordance with another embodiment addition of the present invention, hydrocarbon gas is combusted with $SO_2$ and oxygen, and by adding heated recycled sulfur into the burner to prevent the soot formation and or adding additional stream of the recycled sulfur into a single refractory line reaction furnace to consume produced H2 and CO at a temperature of 1100° C. to 1400° C. The effluent gas is cooled in a waste heat boiler and sulfur condenser to recover elemental sulfur. The effluent gas from sulfur condenser is treated in one or more Claus conversion stages comprising a reheater, converter and condenser to produce and recover additional sulfur.

In accordance with another embodiment of the present invention, hydrocarbon gas is combusted with $SO_2$ and oxygen in a refractory line single reaction furnace containing and alumina monolith which performs as an active catalyst at a temperature of 1100° C. to 1400° C. The effluent gas from the reaction furnace is cooled in a waste heat boiler and sulfur condenser to recover elemental sulfur. The effluent gas from sulfur condenser is treated in one or more Claus conversion stages comprising a reheater, converter and condenser to produce and recover additional sulfur.

In accordance with another embodiment of the present invention, hydrocarbon gas is combusted with $SO_2$ and oxygen in a refractory single reaction furnace at a temperature of 1100° C. to 1400° C. A portion of the effluent gas from the waste heat boiler or any of sulfur condensers is recycled to the reaction furnace via mixing with the reducing agent to prevent soot formation, and or a portion of the effluent gas from the waste heat boiler or any of sulfur condensers is recycled to the reaction furnace to consume H2 and CO. The effluent gas from the reaction furnace is cooled in a waste heat boiler and sulfur condenser to recover elemental sulfur. The effluent gas from sulfur condenser is treated in one or more Claus conversion stages comprising a reheater, converter and condenser to produce and recover additional sulfur.

In further accordance with aspects of the present disclosure, the activated catalyst in the Claus conversion zone is an alumina, titania, or a mixed bed with alumina on the top and a layer of titania and/or a layer of cobalt-molybdenum catalyst on the bottom of the reactor separated by the Claus catalyst supports, which promotes a Claus reaction in the reactor, consumes residual hydrogen, and produces additional hydrogen sulfide and carbon dioxide by hydrolysis. In still further accordance with the present disclosure, residual effluent streams comprising $H_2S$ and/or $SO_2$ may be further contacted with one or more additional catalytic process stages in order to produce additional elemental sulfur. Such additional catalytic process stages may employ alumina and/or titania catalysts or their equivalents.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

Figure 1:
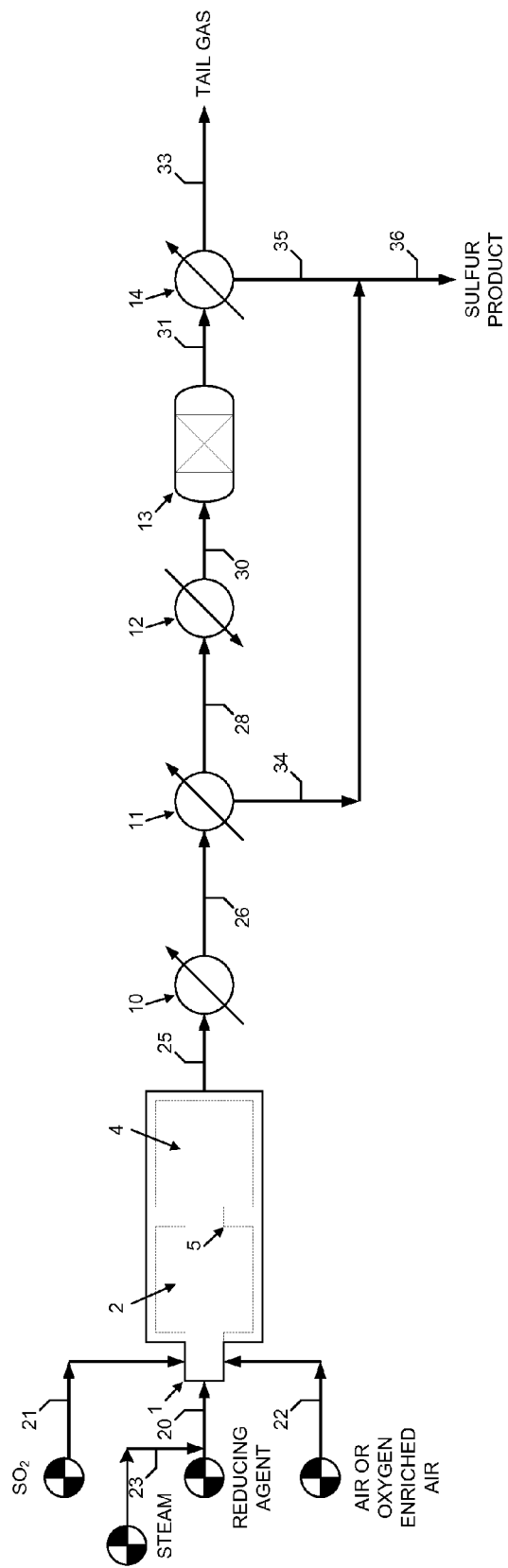
FIG. 1 illustrates a schematic diagram embodiment of the present disclosure consisting of a single reaction furnace by adding steam.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes for the thermal reduction of sulfur dioxide ($SO_2$) to elemental sulfur having high purity and in both reasonable economic costs and amount of sulfur recovered.

The present invention relates to processes for recovering sulfur from sulfur dioxide ($SO_2$) containing waste streams using thermal reduction methods. Key advantages of the processes described herein include lower fuel consumption and favorable operability parameters (e.g., reasonable capital and operating costs), reduced emissions, better sulfur product quality (post-recovery), increased sulfur recovery efficiency, and better operational stability. Depending upon the quantity of $SO_2$, the concentration of the $SO_2$, the presence of impurities and/or the oxygen content of the $SO_2$-containing waste stream, the stream may or may not be concentrated by one or more known concentration processes prior to introduction into the process of the present disclosure. The present invention has the advantages of being able to handle any $SO_2$ concentration to the reaction zone without causing soot formation which the quality of the liquid sulfur is improved and use of expensive catalyst is eliminated.

In accordance with aspects of the present invention, it is an object of the present disclosure to provide a process for producing elemental sulfur from sulfur dioxide-containing gases and waste streams containing sulfur dioxide in high overall recovery yields, and with a minimum number of process steps. A further object of the present disclosure it to provide such a process which results in a minimum number of formed byproducts, which would otherwise require further treatment and/or disposal.

A further object of the present disclosure is the provision of an efficient process for converting sulfur dioxide to elemental sulfur in amounts required in, and economically acceptable for, present day industrial operations. Another object is to provide such a process which can tolerate variances in operating conditions within a given range without major equipment adaptations. A further object is to provide a process which can be utilized in co-acting phases to provide, at acceptable economics, the capacity required in present-day industrial operations.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions.

In the single reaction furnace, the hydrocarbon containing gas stream comprises one or more hydrocarbons selected from the group consisting of alkanes, alkenes, alkynes, cycloalkanes, aromatic hydrocarbons, and mixtures thereof.

Turning now to the figures, in FIG. 1, in the reaction furnace zone, a waste stream comprising $SO_2$ (21), a gas stream comprising oxygen (22), such as air, oxygen-enriched air, or substantially pure oxygen, and a reducing agent (20), comprising gaseous hydrocarbons, such as natural gas or the like, and a steam stream (23) added to the reducing agent stream and are conveyed into a burner (1). The gaseous mixtures may be separately preheated to a temperature ranging from about 150° C. up to about 350° C. in preheaters (not shown). In accordance with the present disclosure, it is not required to heat any of the gaseous streams entering the reaction furnace zone burner. However, in order to reduce the fuel consumption of the hydrocarbon stream, and in order to reduce the cost of fuel as well as increase the economic desirability of the presently disclosed processes, it may be preferred in some cases to use preheaters to raise the temperature of the respective gas streams prior to their entrance into reaction furnace burner (1). With continued reference to FIG. 1, the heated gaseous hydrocarbon stream, $SO_2$-containing waste stream, and steam stream and heated oxygen-containing stream are combined and mixed in the reaction furnace burner (1) portion of the reaction furnace zone, and are then conveyed into the reaction furnace (2). The reaction furnace is typically a carbon steel vessel with an internal lining comprising high alumina refractory and alumina monolith where performs as an active catalyst.

The sulfur dioxide ($SO_2$) stream (21) is preferably a waste stream effluent comprising a molar concentration of $SO_2$ ranging from about 1% to about 100%, which can come from any number of suitable $SO_2$ sources, including but not limited to the numerous gases emanating from plants involving roasting, smelting, and sintering of sulfide-containing ores; gases from power plants burning high sulfur coal, fuel oils, or other sulfurous ores; industrial operations involved in the combustion of sulfur-bearing fuels, such as fuel oil; tail gas streams from any number of process plants, the condensation of enriched stripper gases, tail gas effluent, and the like; from the combustion of fossil fuels; from the burning of crude oils; from the smelting of sulfide ores such as iron pyrites and sphalerite (zinc blende); and heating calcium sulfate (gypsum) with coke and sand in the manufacture of cement.

In accordance with an aspect of the present invention, the $SO_2$ stream (21) is preferably pretreated to remove particulate material and concentrate the stream to a molar concentration ranging from about 25% to about 100% before entering the unit, although removal of particulates and concentration is not necessary for operation of the presently described process.

In accordance with the present disclosure, reducing agent (20) may comprise a hydrocarbon such as methane (CH4) or a hydrocarbon mixture, The amounts of reducing agent, oxygen, and $SO_2$ comprising effluent streams fed to the unit may be controlled so as to maintain the mole ratio of $H_2S$ to $SO_2$ in the tail gas stream of the overall process. It is presently preferred that the $H_2S$ to $SO_2$ mole ratio be controlled so as to be in a range from about 2:1 to about 10:1, and more preferably from about 2:1 to about 5:1, although ratios outside of these ratios may be appropriate, depending upon the overall setup of the production process.

Steam is added to the reaction furnace via mixing with the fuel as a reducing agent to prevent soot formation.

The reaction between the $SO_2$-containing effluent stream, oxygen-containing gas, and heated hydrocarbon continues within the reaction furnace (2), wherein the stream that contains hydrocarbon is combusted to generate hydrogen gas ($H_2$) and CO, resulting in the hydrogenation of $SO_2$ to $H_2S$ with subsequent thermal conversion of $H_2S$ and residual $SO_2$ to sulfur, according to the Claus reaction. The thermal reduction conducted within in the first reaction furnace (2) occurs at temperatures ranging from about 1100° C. to 1400° C., and more preferably from about 1200° C. to about 1300° C. It has been found that at temperatures below 1100° C., combustion of the hydrocarbon reducing agent is not complete resulting in tar-like substances that foul downstream equipment and produce poor quality sulfur. At temperatures above 1400° C., the hydrocarbons in the reducing agent tend to crack to form elemental carbon which also fouls downstream equipment and produces poor quality sulfur. Steam is added to prevent the soot formation and to improve sulfur quality. Operation of the reaction furnace in the temperature range from 1100° C. to 1400° C. results in significant byproduct $H_2$ and CO in the first reaction furnace effluent stream (23) which if not consumed would increase the fuel demand of the process.

With continued reference to FIG. 1, the reaction furnace effluent gas stream (25) is cooled in the waste heat boiler (10) to a temperature ranging from about 600° C. to 1100° C. The figure illustrates a waste heat boiler that produces steam, however, any suitable heat exchanger, such as a water heater, steam superheater or feed effluent exchanger may be employed in this service.

With continued reference to FIG. 1, the exiting gas from the waste heat boiler stream (26) enters the first condenser (11) wherein the gas is further cooled to a temperature ranging from about 130° C. to 200° C. and sulfur is condensed and recovered. The first condenser liquid sulfur (34) may be collected in a sulfur pit or other suitable vessel, located either below or above grade. The first condenser effluent gas stream (28) enters the first reheater (12) wherein the gas is heated to a temperature appropriate for the reaction of $H_2S$ and $SO_2$ to form sulfur and the hydrolysis of COS and $CS_2$ to $H_2S$ and $CO_2$, preferably in the range from 165° C. to 400° C. Any type of suitable reheater device or method may be employed, such as an indirect steam reheat, hot gas bypass, or inline burner.

The first reheater effluent stream (28) enters the first converter (13), which comprises one or more fixed bed reactors containing a catalyst.

The first converter catalyst comprises at least one Claus catalyst, such as alumina, or titania. A layer of Co/Mo (cobalt-molybdenum) catalyst may be used at the bottom of the reactor to scavenge any remaining $H_2$ and CO.

The effluent gas stream (31) exiting from catalytic reactor no.1 (13) is cooled to an appropriate temperature, e.g., to a temperature ranging from about 130° C. to about 200° C., in the second sulfur condenser (14) to produce condensed elemental sulfur (35), which is then conveyed to sulfur pit as described above in reference to the first sulfur condenser (11).

The gas effluent (32) from the second sulfur condenser (14) may be treated in one or more additional stages, comprising a reheater, converter and condenser to recover additional sulfur or may be processed in any other tail gas treatment unit commonly used to treat Claus unit tail gas streams.

Figure 2:
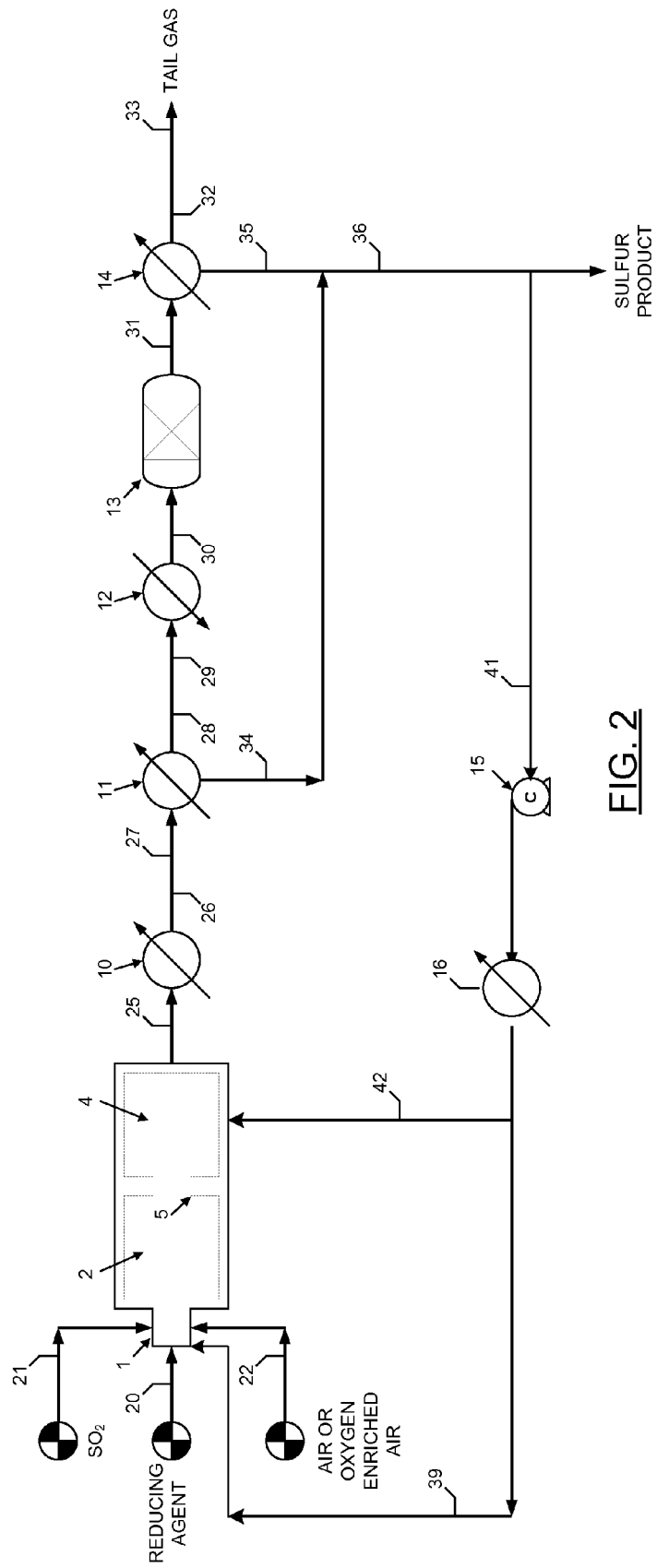
FIG. 2 illustrates a schematic diagram of an alternate embodiment of the present disclosure consisting a single reaction furnace and adding heated recycle sulfur.

Turning to FIG. 2, where the reaction zone is the same as FIG. 1 and the difference is recycled sulfur is added in one or two different locations. Recycled sulfur is added to the burner to reduce or eliminate the soot formation. In addition recycled sulfur is added to the reaction furnace at a point downstream of the burner to consume produced H2 and CO; wherein to effect reaction between $H_2$ and sulfur and CO and sulfur and water. It has been found that significant amounts of $H_2$ and CO are consumed and near equilibrium conditions are attained.

As further illustrated in FIG. 2 reaction furnace is a vessel with a choke ring or checker wall (5) in a carbon steel alumina refractory vessel with alumina monolith where performs as an active catalyst. where to promote a turbulent velocity for good mixing.

Figure 3:
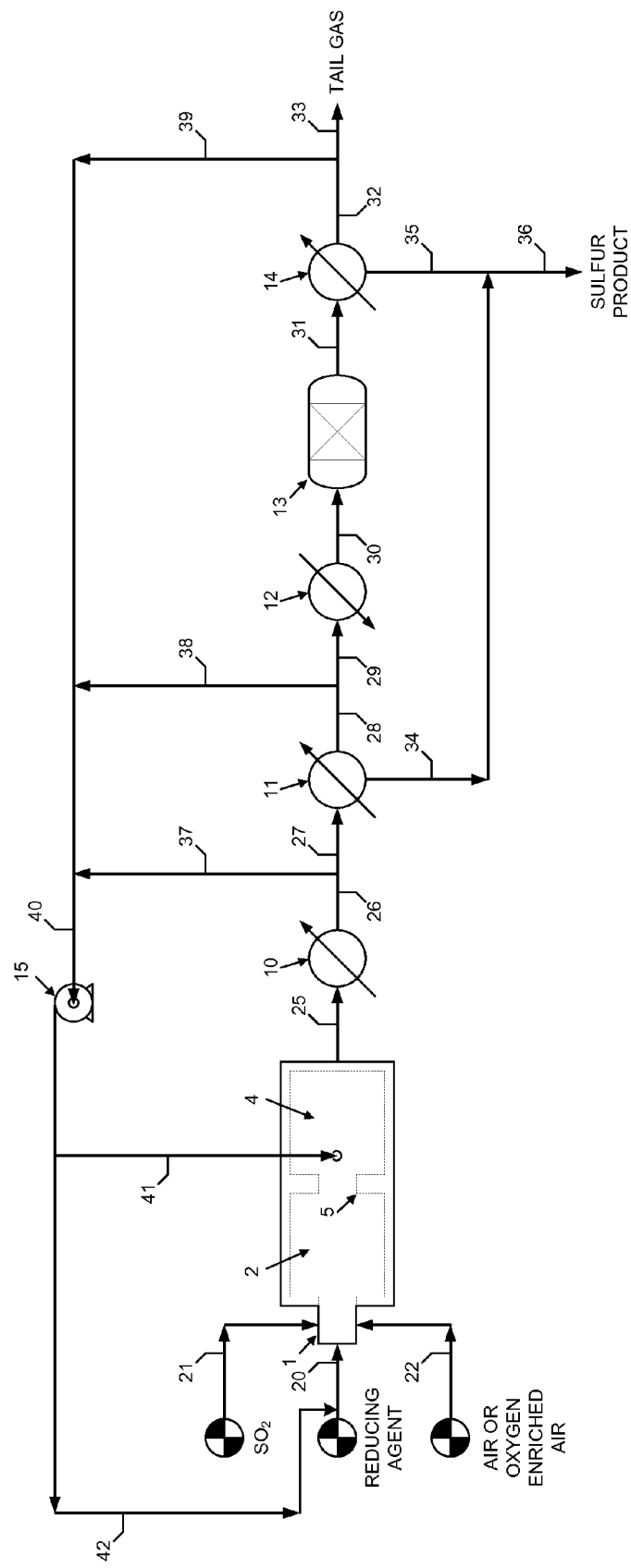
FIG. 3 illustrates a schematic diagram of an alternate embodiment of the present disclosure consisting a single reaction furnace and adding the tail gas recycle.

Turning to FIG. 3, where the concept of the invention is the same, where the reaction zone is the same as FIG. 1 with the difference of adding a recycled tail gas stream in one or two locations on the reaction furnace.

A portion of the tail gas stream from the waste heat boiler or any of the condenser outlets may be recycled through a recycle blower or ejector (15), to the reducing agent to reduce or eliminate soot formation. In addition a portion of the recycled tail gas may be recycled to the reaction furnace at a point downstream of the burner to moderate the temperature and consume produced H2 and CO.

As further illustrated in FIG. 3 reaction furnace is a vessel with a choke ring or checker wall (5) in a carbon steel alumina refractory vessel with alumina monolith where performs as an active catalyst. where to promote a turbulent velocity for good mixing.

The converters in the Claus conversion step of this present process disclosure, employ one or more Claus catalysts including alumina catalysts, activated alumina catalysts (such as S-100 SR catalysts), alumina/titania catalysts, and/or titania catalysts, or any other catalyst systems which are employed in the Claus process., the catalysts having a range of surface area, pore volume, shapes (e.g., star shaped, beads, or powders), and percent catalyst content (in non-limiting example, from about 50 wt. % to about 95 wt. % $Al_2O_3$, having a purity up to about 99+%), without any limitations. The Claus processes within converter and subsequent converters, such as converter may be carried out at conventional reaction temperatures, ranging from about 200° C. to about 1300° C., and more preferably from about 240° C. to about 600° C., as well as over temperature ranges between these ranges, including from about 210° C. to about 480° C., and from about 950° C. to about 1250° C., without limitation.

The number of Claus conversion steps employed, which may range from one stage to more than ten, depends on the particular application and the amount of sulfur recovery required or desired. In accordance with certain non-limiting aspects of the present disclosure, the number and placement of multiple converters/reactors, and the associated condenser systems, may be adjusted without affecting the overall thermal reduction process described herein.

The process is typically able to achieve an overall sulfur recovery efficiency of greater than about 80%, and preferably greater than about 90%, based on the theoretical amount of recoverable sulfur. For example, the sulfur recovery efficiency may be about 95% (or more) with an initially-concentrated $SO_2$-containing waste stream and three Claus conversion stages.

With continued reference to the invention, the tail gas stream (33) upon exiting the last reaction stage, may optionally be conveyed to any typical tail gas absorption process, sub dew point process or any type of incineration process to increase sulfur recovery efficiency to about 100%.

As described herein, the liquid sulfur recovered by the disclosed processes (36) is typically collected in a sulfur pit or other appropriate collection device or approved location, and may be removed as appropriate, such as by a sulfur pump or pump system to be handled by others, or shipped as appropriate.

In accordance with the present invention, any method of preventing soot formation or any method of consuming produced H2 and CO mentioned above could be used separately or in a combination of any of the other methods.

The three methods of preventing soot formation in the reaction furnace and the two methods of consuming H2 and CO in the reaction zone of this invention is to minimize the soot formation and to maximize the hydrogen and carbon monoxide consumption and any combination of these methods could be applied to obtain desirable conversions in the reaction zone.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:

1. A process for the production of sulfur from sulfur dioxide ($SO_2$)-containing effluent streams, the process comprising:
    a) forming a mixture of oxygen containing gas with a hydrocarbon gas stream and feeding this mixture together with a separate stream of sulfur dioxide containing gas in a single Catalytic reaction furnace zones, containing an "Alumina Monolith" which performs as an Active Catalyst wherein reactions occur at an elevated temperature for a period of time sufficient to produce an effluent stream comprising sulfur (S), hydrogen, CO, and water;
    b) the process comprises 2 different reaction zones: a single Catalytic reaction furnace zone, and a Claus Catalytic conversion zone;
    c) contacting the effluent gas stream from the catalytic reaction furnace zones in one or more Claus catalytic reaction stages comprising one or more catalysts; and;
    d) recovering elemental sulfur from the product gas stream.

2. The process of claim 1, wherein steam (water vapor) is added to the reducing agent hydrocarbon gas stream to eliminate soot formation in the catalytic single reaction furnace zones.

3. The process of claim 1, wherein the reaction furnace is equipped with one or more checker wall or choke ring.

4. The process of claim 1, wherein the amount of recycled sulfur to the catalytic zones of the reaction furnace may range from 0.05 to 3 mole percent of the feed gas.

5. The process of claim 3, wherein a portion of produced sulfur is recycled to the catalytic zones of the reaction furnace burner to eliminate soot formation.

6. The process of claim 3, wherein, a portion of produced sulfur is recycled to the catalytic zones of the reaction furnace to consume produced H2 and CO and to moderate the temperature.

7. The process of claim 1, wherein, a portion of the tail gas from the waste boiler outlet or from any of the sulfur condensers is recycled and added to the reducing agent hydrocarbon gas stream, to eliminate soot formation.

8. The process of claim 1, wherein, a portion of the tail gas from the waste boiler outlet or from any of the sulfur condensers is recycled to the reaction zone, to moderate the temperature and consume H2 and CO.

9. The process of claim 1, wherein, in the catalytic reaction furnace zones, the residence time is 0.2 to 10 seconds.

10. The process of claim 1, wherein, the catalytic reaction furnace zones are followed by the second reaction zone Claus section comprises one or more reactors.

11. The process of claim 9, wherein, after the catalytic reaction furnace zones one or more catalysts comprises alumina, titanium, or cobalt, molybdenum (Co/Mo) or combinations on an alumina or inorganic support material are used in the second reaction zone reactors.

12. The process of claim 1 in which greater than 80% elemental sulfur recovery efficiency can be achieved and the overall recovery from all reaction zones greater than 90% sulfur recovery from the waste stream effluent can be achieved.

13. The process of claim 1, wherein in the reaction furnace, one or more of the gaseous hydrocarbon stream, gaseous oxygen-containing stream, and the $SO_2$-containing gas stream enter the reaction furnace burner after a preheating step wherein the gases are preheated to a temperature of from 150° C. to 350° C.

14. The process of claim 1, wherein in the catalytic zones of single reaction furnace, the sulfur dioxide containing stream comprises $SO_2$ in a molar concentration ranging from about 1 mol % to about 100 mol %.

15. The process of claim 1, wherein in the catalytic zones of single reaction furnace, the sulfur dioxide containing effluent stream comprises $SO_2$ in a molar concentration ranging from about 25 mol % to about 100 mol %.

16. The process of claim 1, wherein in the catalytic zones of single reaction furnace, the hydrocarbon containing gas stream comprises one or more hydrocarbons selected from the group consisting of alkanes, alkenes, alkynes, cycloalkanes, aromatic hydrocarbons, and mixtures thereof.

17. The process of claim 1, wherein the rate of the hydrocarbon stream is adjusted such that the mole ratio of hydrogen sulfide to sulfur dioxide in the gaseous-mixture reaction stream ranges from about 2:1 to about 10:1.

18. The process of claim 1, wherein the elevated temperature in the catalytic zones of single reaction furnace is 1100° C. to 1400° C.

19. The process of claim 1, wherein, the tail gas is further processed in any tail gas processes or any type of incineration to achieve 100% sulfur recovery efficiency.

20. The process of claim 1, wherein the recovering process from catalytic zones of the reaction furnace followed by Claus catalytic stages comprises cooling the product gas stream in one or more sulfur condensers to condense and recover elemental sulfur from the product gas stream.

21. The process of claim 1, further comprising removing particulate material from the sulfur dioxide-containing stream prior to conveying the stream to a reaction furnace.

\* \* \* \* \*